United States Patent [19]

Auslander

[11] Patent Number: 5,684,069
[45] Date of Patent: Nov. 4, 1997

[54] COMPOSITION FOR INVISIBLE INK RESPONSIVE TO INFRARED LIGHT

[75] Inventor: Judith D. Auslander, Westport, Conn.

[73] Assignee: Pitney Bowes Inc., Stamford, Conn.

[21] Appl. No.: 310,905

[22] Filed: Sep. 22, 1994

Related U.S. Application Data

[63] Continuation-in-part of Ser. No. 159,065, Jan. 12, 1994, abandoned.

[51] Int. Cl.$^6$ .................................................. C08K 5/34
[52] U.S. Cl. .................... 524/88; 523/161; 524/277; 524/563; 106/21 A; 106/23 B; 260/DIG. 38
[58] Field of Search .......................... 523/141; 524/88, 524/277, 563; 106/21 A, 23 D; 260/DIG. 38

[56] References Cited

U.S. PATENT DOCUMENTS

| | | | |
|---|---|---|---|
| 3,875,199 | 4/1975 | Bloom | 556/136 |
| 3,999,838 | 12/1976 | Sprokel | 359/45 |
| 5,084,205 | 1/1992 | Auslander | 252/301.16 |
| 5,160,171 | 11/1992 | Gregory et al. | 283/91 |
| 5,282,894 | 2/1994 | Albert et al. | 106/22 D |

FOREIGN PATENT DOCUMENTS

| | | |
|---|---|---|
| A 0420613 | 3/1991 | European Pat. Off. . |
| A 0553614 | 8/1993 | European Pat. Off. . |
| A 2209975 | 8/1990 | Japan . |
| 04307282 | 4/1991 | Japan . |
| 05085062 | 9/1991 | Japan . |

OTHER PUBLICATIONS

Novel Phthalocyanies for positive charging organic photoconductors by Peter Gregory presented to Society of Photographics Sciences & Electric Photography Conference Mar. 1988 in New Orleans, Louisiana.

*Primary Examiner*—Paul R. Michl
*Assistant Examiner*—John J. Guarriello
*Attorney, Agent, or Firm*—Ronald Reichman; Melvin J. Scolnick; Peter Vrahotes

[57] ABSTRACT

An invisible ink has been discovered that utilizes a substituted phthalocyanine dye in combination with selected waxes and resins. The resulting ink is one that has use in thermal printing and is transparent or almost transparent in white light, but is responsive to infra-red light in the range of 720 to 1000 nm. The preferred waxes are polyethylene wax, natural paraffin wax and carnauba wax, and the preferred resin is ethyl vinyl acetate polymer.

11 Claims, 2 Drawing Sheets

COMPOSITION FOR INVISIBLE INK RESPONSIVE TO INFRARED LIGHT

This application is a continuation-in-part of application Ser. No. 08/159,065 filed Jan. 12, 1994, now abandoned.

BACKGROUND OF THE INVENTION

One of the by-products of the business climate being driven by technological advances is the need of greater security. This is particularly true of documents that are issued by governments, financial institutions, brokerage houses and the like. One scheme that has been proposed for providing security is to print authenticating text in invisible ink so that the same does not interfere with the document upon which such text is printed, but one, nevertheless, is able to determine the authenticity of the document and the holder of the document as well. An example is described in copending patent application Ser. No. 08/090,671 entitled Document Authentication System Utilizing a Transparent Label, filed May 7, 1993 (C-646) in which a scheme is described for placing a transparent label over a document with text printed on the label in invisible ink so that text covered by the label can be read. By invisible ink is meant an ink that is either not visible to the naked eye or is transparent so that one is able to distinguish anything covered by the invisible ink. In addition, the invisible ink also must be responsive to light of a particular frequency range, such as light in the infra-red range.

Although there are a number of invisible inks that are commercially available, most of these inks are responsive to ultraviolet light. Although such inks are useful, having an invisible ink that is responsive to infra-red light is more advantageous as devices for reading in the infra-red range are more reliable and inexpensive. Recently, Zeneca Ltd. has developed suitable dyes that are sufficiently responsive to infra-red light. These dyes, with appropriate solvents and other components, have been used to formulate inks that have use in the ink jet printing field. Although the inks developed by ICI answered a long sought need, these inks are not suitable for use in thermal printers. Thermal printers are high quality, low cost, low speed printers that use a ribbon in the form of a film which is sensitive to heat for transferring ink to a contacting surface. They are capable of printing on difficult to print surfaces such as plastics or other non-porous surfaces, because it is a non-impact contact type of printing. Clearly, it would be advantageous to have an invisible ink responsive to light in the infra-red range that can be applied by thermal printing.

SUMMARY OF THE INVENTION

It has been found that a suitable invisible ink composition for thermal printing is obtained by combining an substituted phthalocyanine dye with selected waxes and other appropriate ingredients. The aforementioned ink may be utilized to provide document security by printing authenticating text in the above invisible ink so that the invisible ink does not interfere with the document upon which such text is printed. More specifically, the invisible ink of this invention uses one or a invisible or almost invisible combination of a substituted phthalocyanine dye, a carnauba wax and other selected waxes. This combination that works well when used as an ink in a thermal transfer process. The combination of phthalocyanine dyes and selected waxes is combined with an ethyl vinyl acetate polymer.

The use of several invisible infrared phthalocyanines dyes gives an additional security advantage. For example, a combination of three phthalocyanine dyes with absorption wavelengths of 780, 830 and 900 nm as shown in the graph depicted in FIG. 2 can be used for enhanced security. The reason for this is that the ratio of different dyes that comprise the invisible ink may be varied so that scanners with specific sensitivities will detect the various ratios of the dyes.

It has been found that the invisible ink composition of the instant invention has advantages as an ink for use in a heat sensitive ribbon of a thermal printer. After being applied to a surface by the thermal printing process, the ink is responsive to light in the infra-red range of 720 to 1000 nm so as to be invisible to the unaided eye but detectable by a sensor. These are particularly attractive ranges, as sensors are more capable of detecting light in these two ranges. In addition, because of the double response, the invisible ink is more readily readable and detectable

DETAILED DESCRIPTION OF THE PREFERRED EMBODIMENT

Figure 1:
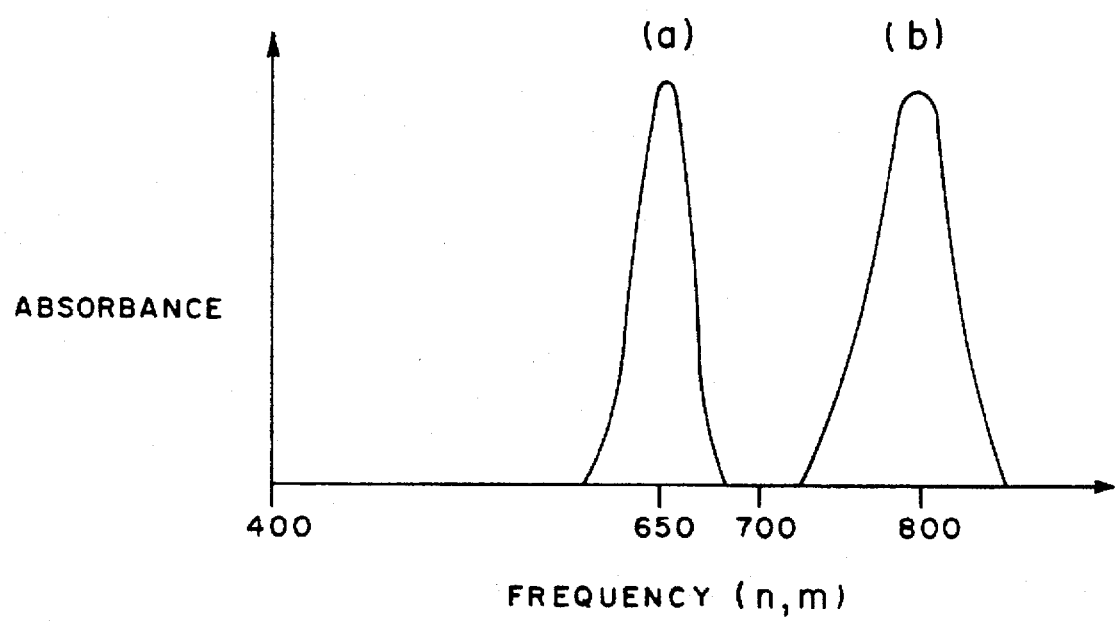
FIG. 1 is a graph depicting the frequency ranges in which the inventive ink is responsive.

It is known that using an invisible substituted phthalocyanine dye as a part of a dye complex in an ink will render the ink made therefrom invisible to ambient light, but responsive to light in the infra-red range. It has been discovered that the combination of such dyes along with selected waxes and resins yield an invisible ink having particular utility for use in a thermal printer. Preferably, the wax portion of the ink will have a composition of 60–80% polyethylene wax. 4–15% urethane derivative of oxidized synthetic wax, and 4–10% carnauba wax. Other waxes that can be used are natural paraffin and microcrystalline waxes. The waxes and dye are combined with an ethyl vinyl acetate (EVA) polymer. The substituted phthalocyanine dye will make up 0.5–5% of the composition and the EVA resin 10–20%. All percentages in this disclosure and accompanying claims are in weight percent. The resulting ink is one that is transparent in the visible region with a slight greenish tinge, but when exposed to infra-red light, can absorb the light between 700–1,200 nm, as seen in FIG. 1.

Figure 2:
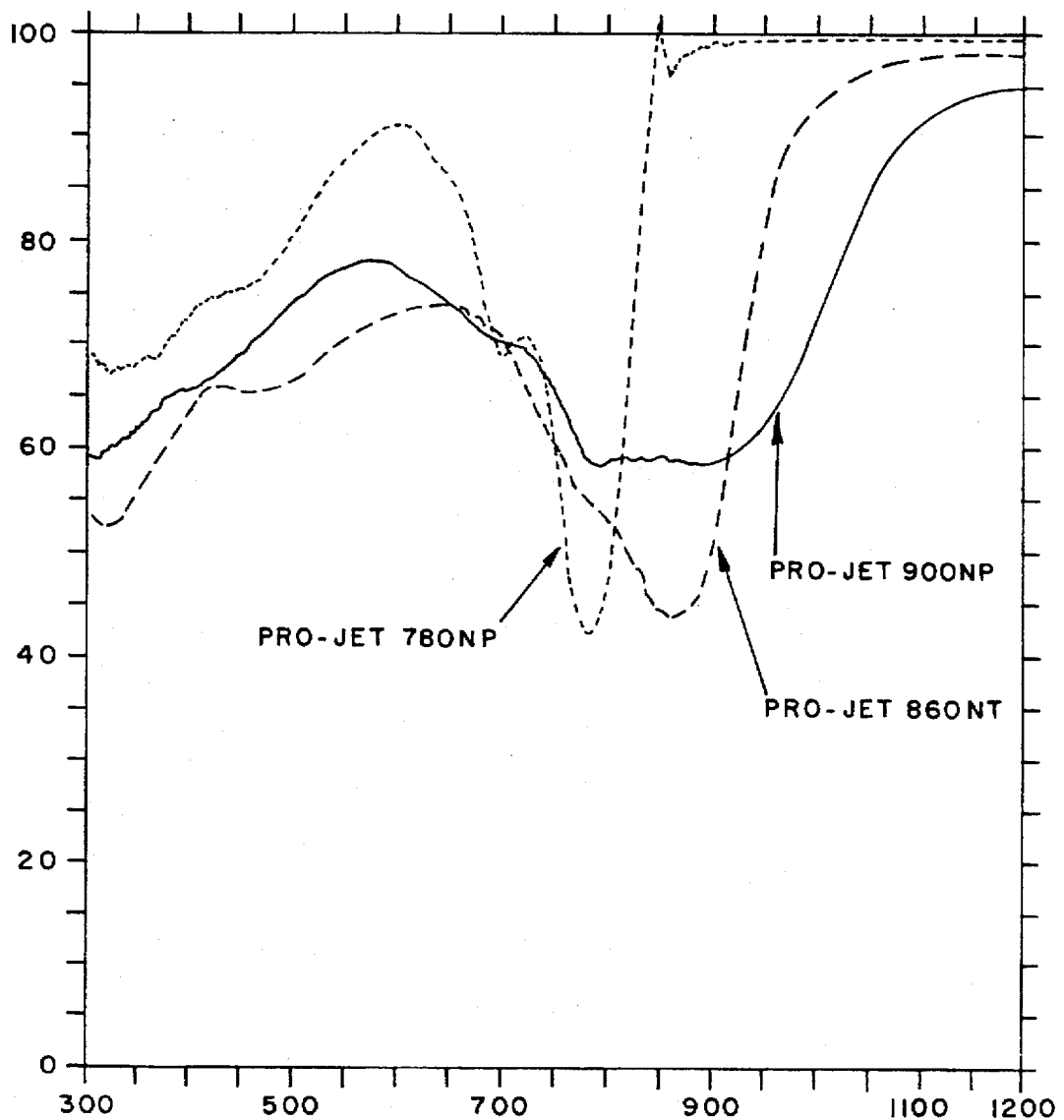
FIG. 2 is a graph that illustrates the manner in which a visible phthalocyanine pigment is transformed by a nucleophilic substitution into a soluble dye with very strong infrared absorption.

When donor groups such as OR, SR, $NR_2$ OH are added to phthalocyanine, pigments a bathocromic shift from red to infra-red occurs in a narrow band at 800 nm or a broad band between 750 nm and 1200 nm as seen in FIG. 2. FIG. 2 represents absorption specific spectra of three different insoluble IR absorbers. As it can be seen in FIG. 2, the absorption varies from 700 to 1,200 nm. The IR absorbers are Pro-Jet 780 NP, Pro-Jet 860 NT, and Pro-Jet 900 NP. The Pro-Jet 900 absorption is approximately 900 nm, and the Pro-Jet 850 NT absorption is approximately 890 nm. The Pro-Jet 780 absorption is approximately 780 nm. The aforementioned Pro-Jet absorbers are manufactured by Zeneca Specialties, P.O. Box 42, Hexagon House, Blackley, Manchester M9 8ZS, ENGLAND. The original colored pigment is transformed by the aforementioned substitution into an invisible, infrared absorbing soluble dye. The resulting dye has high light fastness and high extinction coefficients at the specific near IR wavelength. The general formula for the substituted phthalocyanine dye of the instant invention is as follows:

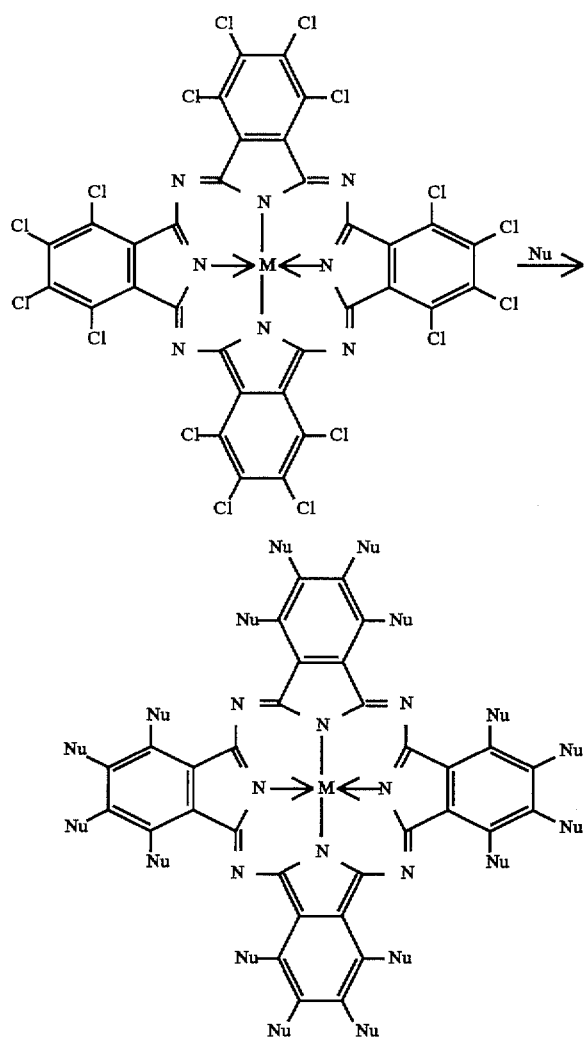

Where M is a metal such as Cu Fe and Mn and Nu are functional groups substituted by the nucleophilic reaction of the original phthalocyanine molecular with donor groups such as amine groups ($NR_2$), hydroxyl groups (OH), alcoxy groups (OR) and thiol groups (SR).

Although there is a slight green tinge at ambient, the ink is sufficiently transparent so that when the invisible ink is placed upon a transparent label, any markings below the transparent label will be readily visible to the naked eye. Commercially available scanners have been found quite capable of detecting and reading the invisible ink of the instant invention. A primary advantage of the instant invisible ink is that the same can be used in a thermal transfer ribbon for use in the thermal transfer printing process. The general composition of the inventive ink is as follows.

| General Composition | | |
|---|---|---|
| Ingredients | Commercial Source | Weight % |
| 1. I.R. Dye substituted phthalocyanine dye | Zeneca Ltd. | 0.5 to 5% |
| 2. Polyethylene wax average molecular weight 300 to 800 | Petrolite Corp. | 60 to 80% |
| 3. urethane derivative of oxidized, synthetic wax | Bareco Div., Petrolite | 4 to 15% |
| 4. carnauba wax | Stahl & Petsch Inc. | 4 to 10% |
| 5. Ethyl vinyl acetate polymer | Dupont Co. | 10 to 20% |

The basic wax vehicles can be varied to contain waxes such as natural paraffin waxes, microcrystalline waxes, and synthetic waxes, but the general composition must always include the phthalocyanine dye, the ethyl vinyl acetate polymer and carnauba wax.

An example of an ink that has been formulated in accordance with the instant invention is as follows:

| Ingredient | Manufacturer (Trade Name) | WT (gms) |
|---|---|---|
| donor group added soluble phthalocyanine | Zeneca Ltd. | 5.00 |
| Polyethylene wax-molecular weight 500, melting point 88° C. | (Polywax 500) Petrolite | 64.1 |
| urethane derivative of synthetic wax | (WB-17) Bareco Div., Petrolite | 7.2 |
| carnauba wax | Strahl & Patsch Inc. | 8.2 |
| Ethyl Vinyl Acetate Polymer | Dupont | 15.5 |
| Ink properties | | |
| Viscosity at 100° C. | | 090 cps |
| Melting point | | 65° C. |
| Max. Absorbance | | 880–900 nm |

The ink was applied to a polyethylene tetraphthalate film with the results discussed below.

The inks of the instant invention exhibit good adhesion to a thermal ribbon film and to a non-porous surface, such as plastic, when applied thereto in a thermal printing operation. These inks have the characteristics of a low melting point which results in good transferability, good flexibility for non-flaking, high hardness that yields high mechanical abrasion resistance and prevents smudging of the final print, water fastness and high light fastness and contrast properties. The inks were found to have good slip and are free of blocking characteristics.

Thus what has been shown and described is an invisible ink that has advantages in that it is sensitive to the infra-red and can be used in a thermal transfer ribbon.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A thermal transfer ink composition that is transparent or nearly transparent having more than 60% reflectance or transmission % T in the visible range between 400 and 700 nm comprising:

a) 0.5 to 5% of a phthalocyanine dye having OR, SR, OH or $NR_2$ donor groups absorbs light between 700 nm to 1200 nm that is transparent or nearly transparent having more than 60% reflectance in the visible range of the spectrum;

b) 60 to 80% of a urethane derivative of a modified oxidized synthetic petroleum wax that solubilized the phthalocyanine dye;

c) 4 to 15% carnauba wax; and d) 10 to 20% ethyl vinyl acetate polymer; whereby the ink composition may be detected by a IR sensor detecting light in the IR range of 700 to 1200 nm, and able to be printed on non porous surfaces.

2. The composition of claim 1 wherein said phthalocyanine dye has the formula:

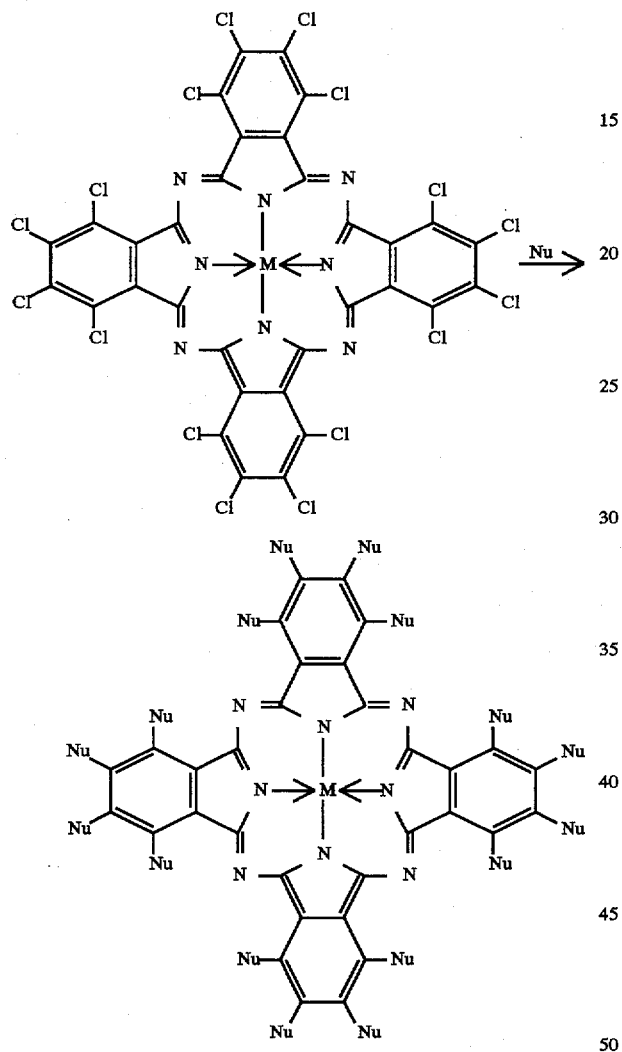

Where Nu are functional groups substituted by nucleophilic reaction on the original phthalocyanine molecule with donor groups.

3. The composition of claim 2 wherein M is selected from the group consisting of copper, iron or manganese.

4. The composition of claim 3 wherein the donor group is selected from amine groups, hydroxy groups, alcoxy groups and thiol groups.

5. A thermal transfer ink composition that is transparent or nearly transparent having more than 60% reflectance or transmission % T in the visible range between 400 and 700 nm comprising:

a) 0.5 to 5% of a phthalocyanine dye having OR, SR, OH or $NR_2$ donor groups absorbs light between 700 nm to 1200 nm that is transparent or nearly transparent having more than 60% reflectance in the visible range of spectrum;

b) 60 to 80% of a polyethylene wax;

c) 4 to 15% of a urethane derivative of a modified oxidized synthetic petroleum wax that solubilized the substituted phthalocyanine dye;

d) 4 to 10% of a carnauba wax; and e) 10 to 20% ethyl vinyl acetate polymer; whereby the ink composition may be detected by an IR sensor detecting light in the IR range of 700 to 1200 nm, and able to be printed on non porous substrates.

6. The composition of claim 1 wherein said phthalocyanine dye has the formula:

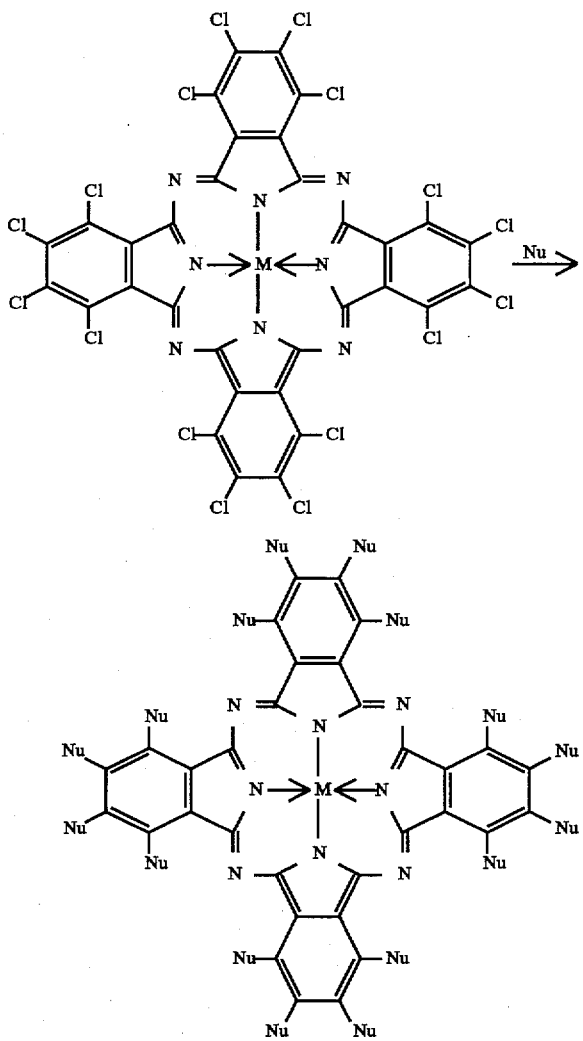

Where Nu are functional groups substituted by nucleophilic reaction on the original phthalocyanine molecule with donor groups selected from amine, hydroxyl, alcoxy and thiol groups.

7. The composition of claim 6 wherein M is selected from the group consisting of copper, iron or manganese.

8. The composition of claim 6 wherein N is in the amine groups.

9. A thermal transfer ink composition that is transparent of nearly transparent in the visible range between 400 and 700 nm comprising:

a) 0.5 to 5% of a combination of two or more invisible IR absorbing phthalocyanine dyes having OR, SR, OH, $NR_2$ donor groups;

b) 60 to 80% of a wax selected from the group consisting of polyethylene wax, natural paraffin wax and urethane derivative of oxidized synthetic wax, c) 4 to 15% carnauba wax, and d) 10 to 20% ethyl vinyl acetate polymer.

10. The composition of claim 9 wherein said phthalocyanine dyes have the formula:

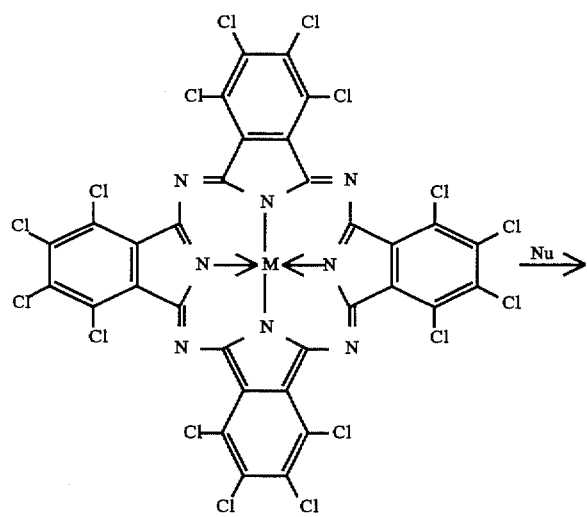

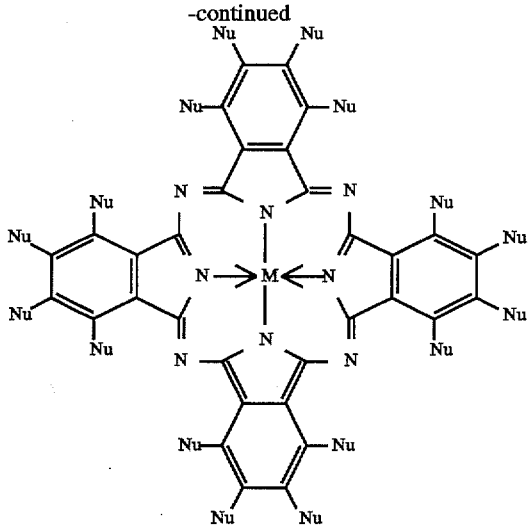

Where Nu are functional groups substituted by nucleophilic reaction on the original phthalocyanine molecule with donor groups selected from amine, hydroxyl, alcoxy and thiol groups.

11. The composition of claim 9 wherein M is selected from the group consisting of copper, iron or manganese.

* * * * *